United States Patent [19]

Bayly et al.

[11] 4,308,978
[45] Jan. 5, 1982

[54] DISPENSING DEVICE

[75] Inventors: Peter K. Bayly, Eltham North; John E. Oretti, Doncaster, both of Australia

[73] Assignee: Peter Bayly Associates Australia Pty. Ltd., Australia

[21] Appl. No.: 114,897

[22] Filed: Jan. 24, 1980

[51] Int. Cl.³ .............................................. G01F 11/38
[52] U.S. Cl. .................................. 222/449; 222/506; 222/452
[58] Field of Search ............. 222/424.5, 425, 444–453, 222/506, 511

[56] References Cited

U.S. PATENT DOCUMENTS

| | | | |
|---|---|---|---|
| 2,626,066 | 1/1953 | Rasmussen | 222/450 |
| 2,721,005 | 10/1955 | Lesnick | 222/448 X |
| 3,165,235 | 1/1965 | Madaffer | 222/448 X |
| 4,121,584 | 10/1978 | Turner et al. | 222/450 X |

FOREIGN PATENT DOCUMENTS

| | | |
|---|---|---|
| 802592 | 10/1958 | United Kingdom |
| 1192383 | 5/1970 | United Kingdom |
| 1273735 | 5/1972 | United Kingdom |
| 436238 | 11/1971 | U.S.S.R. ............................. 222/445 |

Primary Examiner—Joseph J. Rolla

Attorney, Agent, or Firm—Lerner, David, Littenberg & Samuel

[57] ABSTRACT

A dispenser device for liquids including a metering chamber having a valve controlled inlet port and a valve controlled outlet port. An actuator is connected to the two valves to move them between fill and discharge conditions and is arranged to cause the inlet valve to close before opening the outlet valve during transfer from the fill to the discharge condition. The actuator includes a cylinder movable over a piston fixed to the body of the device and the valves respond to movement of the cylinder between two extreme positions corresponding to the fill and discharge conditions respectively. A biasing system urges the cylinder into the fill position at which the inlet valve is open and the outlet valve is closed, and a time delay arrangement operates to retard movement of the cylinder during part of its travel from the discharge position to the fill position. The cylinder is moved into the discharge position by operation of an actuator member and a first latch functions to hold the cylinder at the discharge position until the actuator member returns to its initial rest position, and a second latch functions to hold the actuator member in its rest position until the cylinder returns to the fill position. The two latches are interconnected so that the first is rendered inoperative by movement of the second into its latching position.

28 Claims, 12 Drawing Figures

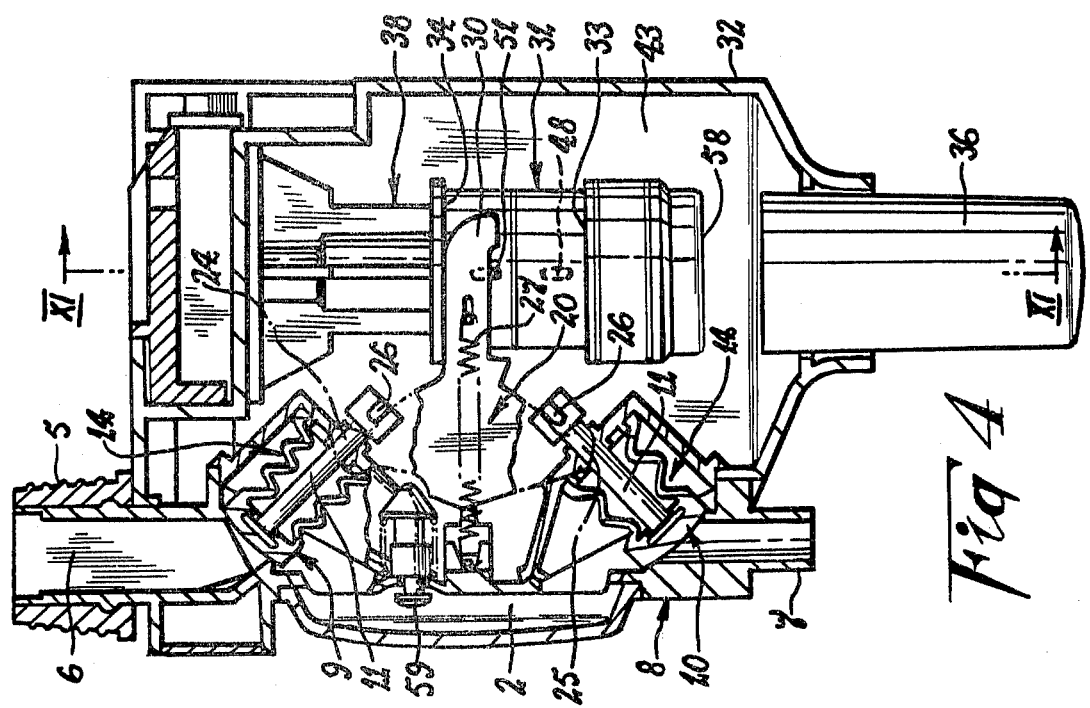
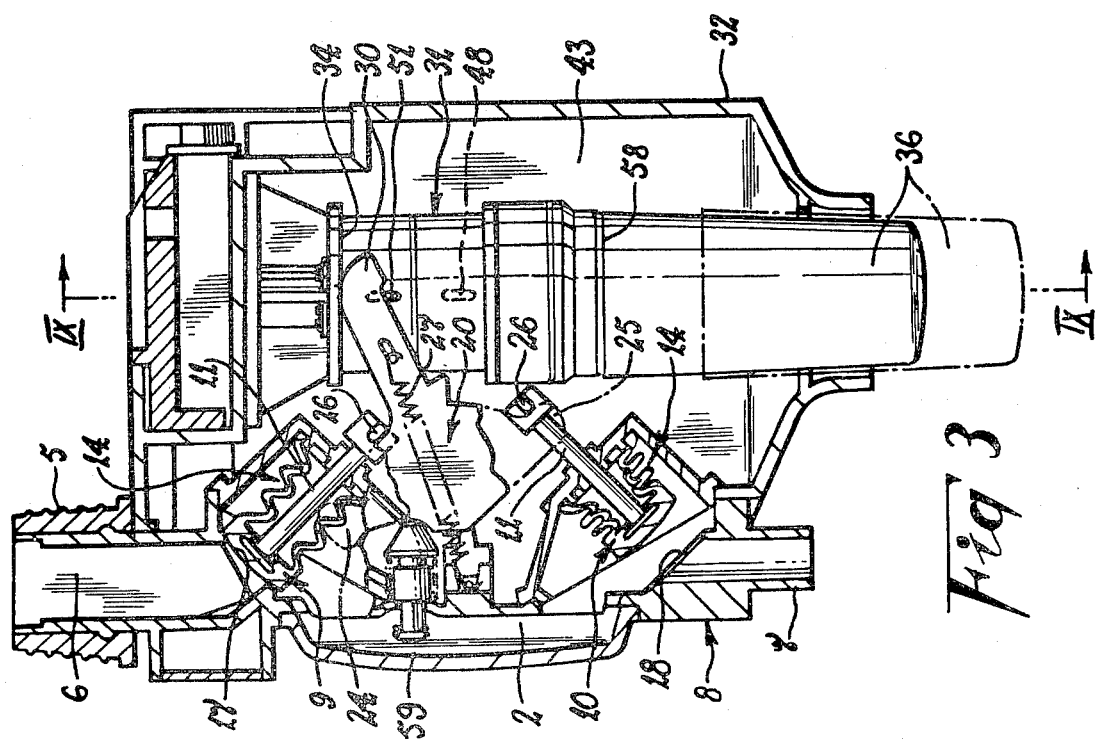

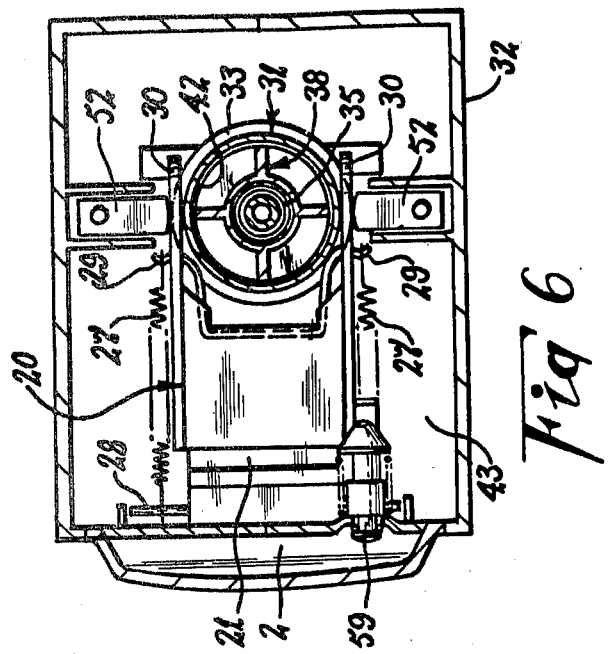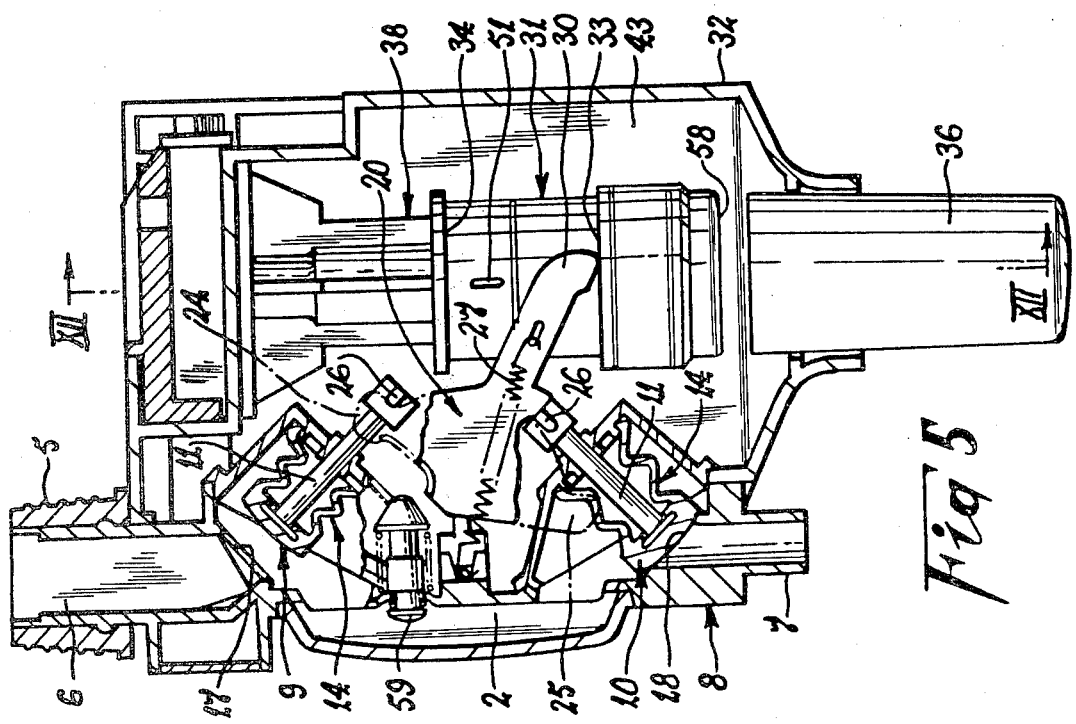

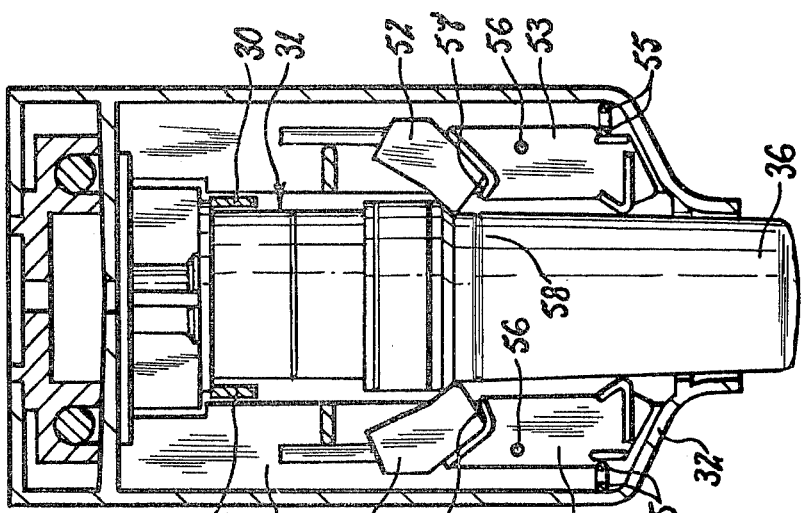
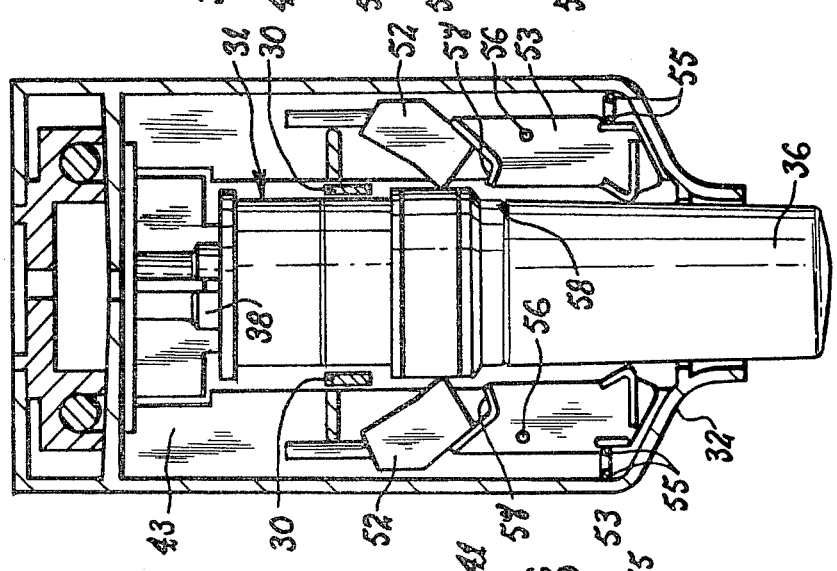
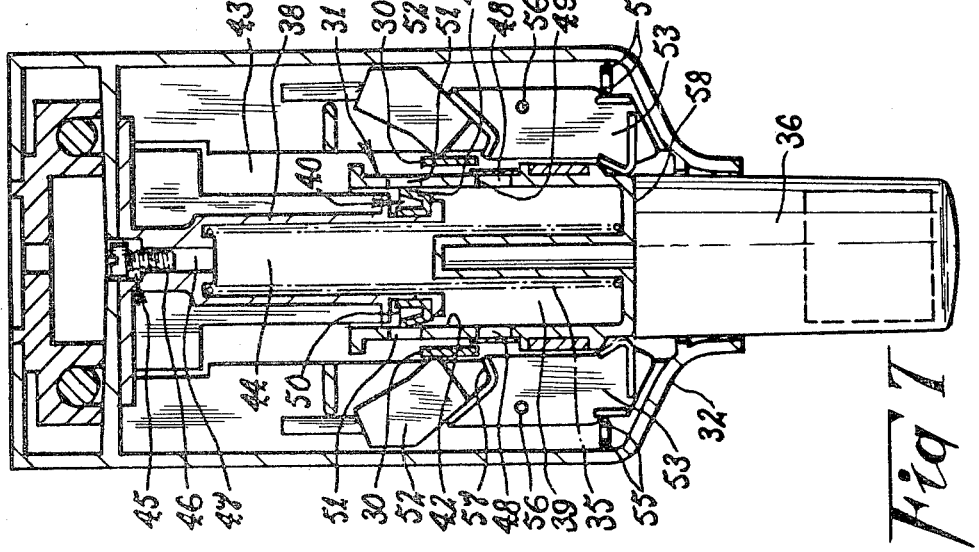

DISPENSING DEVICE

This invention relates to dispensers for liquids, powders, and other flowable materials, and is particularly concerned with such dispensers have a metering facility. It will be convenient to hereinafter describe the invention with particular reference to liquid dispensers, but the invention has many other applications.

Liquid dispensers of the metering kind are commonly used in establishments catering to the public, and it is therefore necessary that they be both accurate and hygenic in use. Such dispensers as used prior to this invention however, have generally failed to meet at least one, if not both, of those requirements.

One commonly used dispenser has a plunger type valve which is spring influenced into a position in which it closes an outlet port at one end of the metering chamber, and leaves open an inlet port at the other end of the chamber and through which liquid is fed into the chamber from a supply source. The plunger valve can be moved manually against the spring so as to open the outlet and close the inlet port, and that movement is generally effected by engaging the rim of a glass or other drinking vessel with a lateral extension provided on an external projection of the valve plunger. Such engagement between the drinking vessel and an exposed part of the dispenser is not considered to be hygenic. Furthermore, the nature of the plunger valve is such that the operator can manipulate the valve so that a full measure as determined by the metering chamber, is not dispensed. In that regard, the outlet port remains open only so long as the plunger is held in an upper position by pressure of the glass engaging the lateral projection of the plunger.

It is a principal object of the present invention to provide a dispenser of the kind indicated which is accurate in operation. It is another object of the invention to provide a dispenser which is hygenic in operation. It is a further object of the invention to provide such a dispenser which minimizes if not prevents the possibility of operator manipulation such as to cause incomplete discharge of the metering chamber.

In accordance with one aspect of the invention, there is provided a dispenser device including, a metering chamber having an inlet port and an outlet port, an inlet valve operative to open and close said inlet port in fill and discharge conditions respectively of said metering chamber, an outlet valve operative to close and open said outlet port in said fill and discharge conditions respectively, actuator means operative to cause movement of said valves to effect a change of the said condition of said metering chamber, the arrangement being such that said inlet valve closes the inlet port before said outlet valve opens the outlet port during a change from said fill condition to said discharge condition. The two valves are preferably arranged for independent movement to an extent permitted by a control member which responds to the actuator means to cause movement of the valves. It is further preferred that the valves are angularly disposed and are biased towards their respective closed positions by resilient sleeves which also provide a resilient sealing face for the head of the valve.

In accordance with another aspect of the invention, there is provided a dispenser device including, a metering chamber having an inlet port and an outlet port, an inlet valve operative to open and close said inlet port in fill and discharge conditions respectively of said metering chamber, an outlet valve operative to close and open said outlet port in said fill and discharge conditions respectively, a valve control member movable between two extreme positions and being operative to influence said valves so that said fill condition exists at one said extreme position and said discharge condition exists at the other said extreme position, a cylinder movable over a fixed piston between a rest position and an activated position, said cylinder being operative during movement from said rest position to said activated position to cause said valve control member to adopt the said other extreme position and being operative during movement from said activated position to the rest position to cause said valve control member to adopt said one extreme position, an actuator member operable to move said cylinder from said rest position to said activated position, biasing means operative to move said cylinder from said activated position to said rest position, and delay means operative to resist movement of said cylinder under the influence of said biasing means to limit the speed at which said cylinder is returned to said rest position. The cylinder preferably directly engages the valve control member which in turn directly engages the valves thereby keeping the component parts to a minimum. Interlock means may be provided to prevent tampering with the device after a discharge operation has been commenced and in particular to prevent movement of the cylinder back towards the activated position once it has started its movement from that position and until it has reached the rest position. The delay means operates during that movement of the cylinder to ensure that there is sufficient time for the metering chamber to be again filled before commencement of the next discharge operation.

According to still another aspect of the invention, there is provided a dispenser device including, a metering chamber having an inlet port and an outlet port, an inlet valve operative to open and close said inlet port in fill and discharge conditions respectively of said metering chamber, an outlet valve operative to close and open said outlet port in said fill and discharge conditions respectively, actuator mechanism operable from a rest condition to cause said valves to move from the positions corresponding to said fill condition to the positions corresponding to said discharge condition, biasing means operative to return said mechanism to said rest condition, and actuator mechanism being operable during said return to cause said valves to move from the positions corresponding to said discharge condition to the positions corresponding to said fill condition, and time delay means operative to retard said actuator mechanism return and being arranged so that the speed of said return is different during at least one part of said return than what it is during at least one other part. The preferred arrangement is for the actuator mechanism to move slowly during the initial part of its movement from the activated condition and to move at an increased speed during a subsequent part which may correspond to the time during which the valves are changed to achieve the fill condition. A third part of that movement may then be relatively slow as with the first part to provide a delay necessary to conclude filling of the metering chamber.

In all aspects of the invention it is preferred that the valves are manually moved into the discharge condition and that return to the fill condition is effected automatically. It is further preferred that lost motion means is provided to prevent the valves being moved into the discharge condition until near conclusion of the manual operation necessary to effect that change of condition.

It will be convenient to now describe the invention in detail with particular reference to one form of liquid dispenser, but as previously stated the invention has numerous other applications, and furthermore may take a form quite different to that described. The example liquid dispenser is of the kind used on bottles and similar containers in hotels and the like, for providing a measured discharge of the contents—e.g., spirits. Bottles having such dispensers are usually mounted upside down on a suitable support and the dispenser it attached to the neck of the bottle in place of the normal closure.

The essential features of the invention, and further optional features, are described in detail in the following passages of the specification which refer to the accompanying drawings. The drawings however, are merely illustrative of how the invention might be put into effect, so that the specific form and arrangement of the features (whether they be essential or optional features) shown is not to be understood as limiting on the invention.

In the drawings:

FIG. 3 is a view similar to FIG. 2 showing conclusion of the manual operation and the dispenser in the discharge condition;

FIG. 4 is a view similar to FIG. 3 but showing the dispenser returning to the initial ready to use condition and the metering chamber has concluded the dispensing operation;

FIG. 5 is a view similar to FIG. 4 but showing the return movement at a more advanced stage and in particular commencement of the next filling operation;

FIG. 6 is a transverse cross-sectional view taken along line VI—VI of FIG. 2;

FIG. 7 is a cross-sectional view taken along line VII—VII of FIG. 1;

FIG. 8 is a cross-sectional view taken along line VIII—VIII of FIG. 2;

FIG. 9 is a cross-sectional view taken along line IX—IX of FIG. 3;

Figure 2:
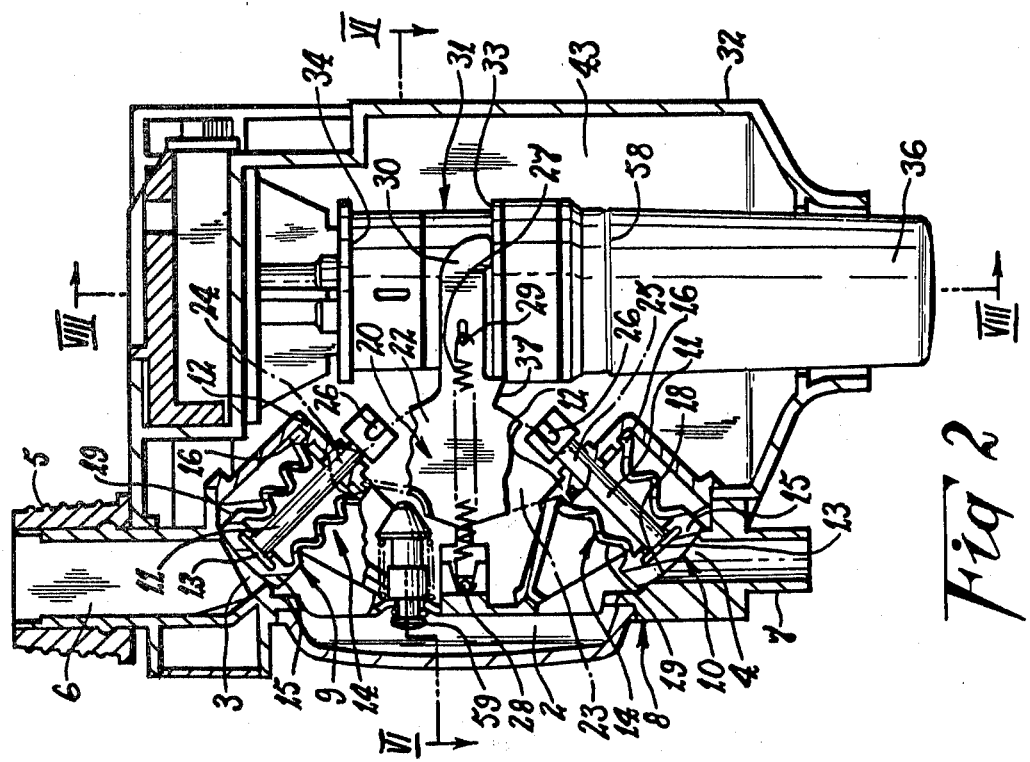
FIG. 2 is a view similar to FIG. 1 but showing the dispenser manually operated and approaching the discharge condition.

The example dispenser shown in the drawings; includes a metering chamber 2 of an appropriate size and having an inlet port 3 and an outlet port 4 to allow passage of liquid into and out of the chamber 2. The inlet port 3 communicates with means for attaching the dispenser to the neck of a bottle (not shown) and that may comprise a resilient plug 5 as shown which can be firmly retained within the bottle neck and having an open ended passage 6 therethrough communicating with the inlet port 3. The outlet port 4 may communicate direct with a discharge nozzle 7, which may be in the form of a tubular member projecting outwardly from the body 8 of the metering chamber 2. It will be apparent that many variations of the bottle attaching means and discharge nozzle are available.

Valve means for controlling flow through the two ports 3 and 4 can be of any suitable form, and the relative disposition and location of the ports 3 and 4 will be determined according to the nature of that valve means. In the particular example shown, the valve means is movable between two conditions of operation—namely, a fill condition in which the inlet port 3 is open and the outlet port 4 is closed (FIG. 1), and a discharge condition in which the inlet port 3 is closed and the outlet port 4 is open (FIG. 3). A separate valve member 9 and 10 is arranged to control flow through each port 3 and 4 respectively, and those members may be interconnected so that only a single operation is required to cause a change in the operative condition of the valves. That is, one valve may close in response to, or simultaneously with, opening movement of the other valve and vice versa. Any such interconnection should naturally take into consideration the fact that it is undesirable to have both ports open together for any significant period of time, since that complicates the metering operation.

In the preferred form shown however, the two valve members 9 and 10 are mounted for independent movement and control means as hereinafter described is operative to cause movement of each valve between its port closing and opening positions. As shown, each valve member 9 and 10 includes a stem 11 slidably mounted in a wall part 12 of the metering chamber body 8 and having a head portion 13 which is located within the metering chamber 2. Each valve member 9 and 10 also includes a resilient sleeve 14 which is closed at one end by a wall 15 and is open at its other end 16. The end wall 15 fits over and is attached to the valve head portion 13 to provide a resilient sealing cap for engagement with a seating surface 17 or 18 (according to which valve is involved) which surrounds the respective one of the ports 3 and 4, and the open end 16 is attached to the wall part 12. The side wall 19 of each sleeve 14 is corrugated to form a bellows-like spring which urges the respective valve member 9 or 10 into the port closing position. That is, when each valve is open the respective sleeve 14 is compressed axially so as to impose a returning force on the valve. The sleeve 14 also serves to provide a seal around the aperture in the wall part 12 through which the valve stem 11 passes.

Figure 1:
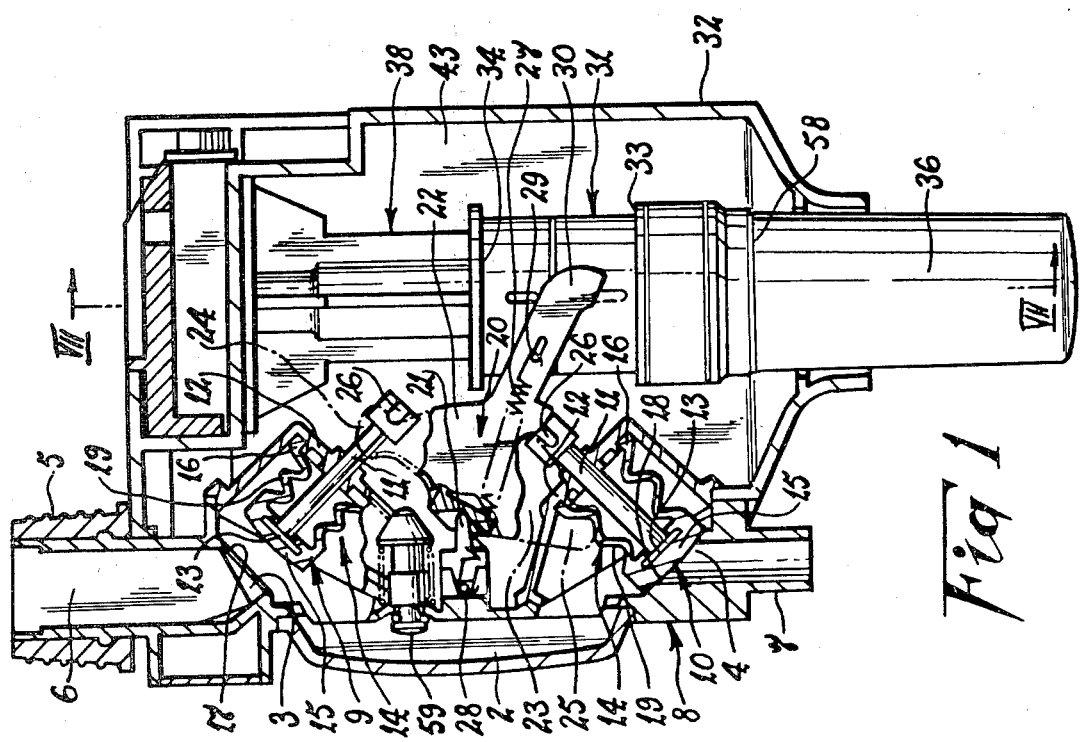
FIG. 1 is a cross-sectional view of one example form of a liquid dispenser incorporating the embodiment of the invention and which shows the dispenser in the ready to use condition.
Figure 10:
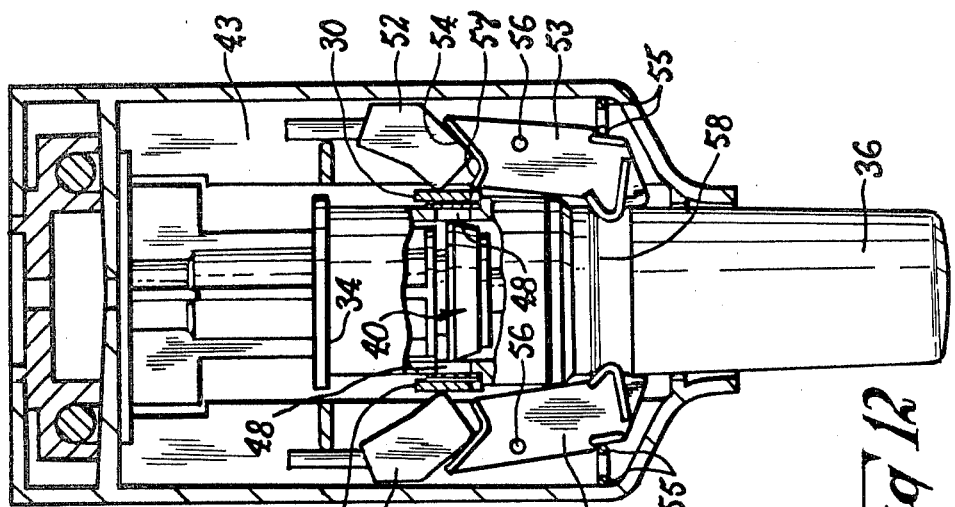
FIG. 10 is a view similar to FIG. 9 but showing the actuator button descending independent of the valve operating mechanism.

The valve control means includes a member 20 which is mounted for limited rocking movement about a pivot or fulcrum 21 (FIG. 1) located intermediate the ports 3 and 4. The member 20 is in the form of a yoke having oppositely directed arms 22 and 23 which respectively influence operation of the valves 9 and 10 as hereinafter described. Movement of the member 20 is between two extreme positions which correspond respectively to the fill and discharge conditions of the valves 9 and 10 and are shown in FIGS. 1 and 3. Yoke arms 22 and 23 have abutments 24 and 25 respectively, each of which is located below a lateral projection 26 secured to the stem 11 of the respective valve 9 or 10. Engagement of each abutment 24 and 25 with the respective projection 26 causes the valve 9 or 10, as the case may be, to be drawn into the port opening position against the action of the spring sleeve 14.

It is preferred to arrange the valve operation so there is a sudden transition into the fill and discharge conditions respectively. For that purpose, the embodiment shown, a spring 27 influences the member 20 into one or the other of its extreme positions according to whether the member 20 is to the one side or the other of a particular pivotal position which is shown in FIG. 2. At that particular position the axis of the pivot 21 is located between and is aligned with the end attachments 28 and 29 of the spring 27 and is therefore on the line of action of the spring 27. It will be seen from FIG. 1 for example that the end attachment 28 is fixed to the chamber body 8 whereas the end attachment 29 is fixed to the member 20. As a result, the line of action of the spring 27 can be moved to one side or the other of the axis of pivot 21 as a consequence of rocking movement of the member 20. When the spring attachment 29 is moved slightly to one side or the other of the FIG. 2 position the spring 27 will immediately draw the member 20 further to that side so that a snap action results. That is, there is very rapid movement of the member 20 from the pivotal position of FIG. 2 to either one of its extreme positions as shown in FIGS. 1 and 3 because of the spring action and also because there is nothing to impede that movement. In that regard, the yoke arms 22 and 23 are able to move freely across their respective valve stems 11 except when engaging a stem projection 26. The spring attachment 29 is located on an actuator arm 30 of the member 20 which cooperates with actoator mechanism as hereinafter described.

It will be seen from FIG. 1 that the yoke arm abutment 25 is located a substantial distance beyond the projection 26 of valve 10 when the member 20 is at that particular extreme position. Similarly, the abutment 24 is spaced a substantial distance from the projection 26 of the valve 9 in the extreme position shown in FIG. 3. The distance to be travelled by the member 20 between an extreme position and a position at which a valve projection 26 is engaged by the member 20, forms part of lost motion means the significance of which will be hereinafter discussed in greater detail.

The yoke arm 23 is preferably provided with a second abutment 37 which is spaced from and is in opposed relationship to the abutment 25. As seen in FIGS. 1 and 5 the abutment 37 engages the end of stem 11 of the outlet valve 10 at that particular extreme position of the member 20 and thereby applies a positive closing force to the valve 10. That force augments the action of the spring bellows 14 to ensure closing of the outlet port 4.

As previously stated, the actual form of the valves can alter according to particular requirements, such as the nature of the material to be metered. For example, granular material may demand a type of valve quite different to that used for a liquid material. Also, the desired snap action change over from one operative to the other, can be achieved in a manner quite different to that particularly described.

The actuator means or mechanism for controlling movement of the yoke member 20, and consequently the valves 9 and 10, includes an active component which is movable between a rest position and an activated position which correspond respectively to the fill and discharge conditions of the valves 9 and 10. Lost motion means as previously mentioned renders that component ineffective, for the purpose of influencing the valve condition, during a major part of the movement of the component from the rest position to the activated position. In the particular form shown, the active component comprises a cylinder member 31 mounted for sliding movement within a housing 32 secured to or formed integral with the metering chamber body 8. The cylinder member 31 has two spaced abutments 33 and 34 which are engageable with the yoke member arm 30 so as to cause movement of the yoke member 20 as required to change the operative condition of the valves 9 and 10.

As shown in FIG. 1, the spacing of the abutments 33 and 34 is such that the cylinder member 31 must move through a substantial distance from the rest position to a position at which the abutment 33 engages the arm 30. That spacing of the abutments 33 and 34, and the relationship of the abutments 33 and 34 to the arm 30, constitute part of the lost motion means previously referred to. When an abutment 33 or 34 engages the arm 30, continued movement of the cylinder member 31 in the particular direction causes the member 20 to swing about the pivot 21 in the same direction. That is, until the member 20 moves beyond the position shown in FIG. 2 after which the spring 27 takes over to move the member 20 the rest of the distance towards the extreme position—e.g., to the position shown in FIG. 3.

Biasing means in the form of a spring 35 (FIG. 7) preferably urges the cylinder member 31 towards the rest position, which is the position shown in FIG. 1. A manually operable actuator such as a press button 36 is associated with the cylinder member 31 so as to be operable to cause that member to move to the activated position which is the position shown in FIG. 3. The actuator button 36 is preferably separable from the cylinder member 31 as shown so that when it is released it can move back to its initial operative position (FIG. 1) independent of the cylinder member 31. Such return movement may be achieved by gravity of the button 36 is mounted for up and down movement as shown, in which case a weight may be added as assistance, but other biasing means such as a spring could be used.

Return movement of the cylinder member 31 is effected through its biasing spring 35, but that movement is restrained by time delay means. The arrangement is preferably such that the cylinder member 31 does not reach the position shown in FIG. 4, at which the outlet valve 10 is closed, until the metering chamber 2 is empty. One form of time delay means involves the use of a dashpot system which does not substantially hinder movement of the member 31 in the direction from the FIG. 1 position to open the outlet valve 10, but restrains movement of that member 31 in the opposite direction through controlled escape of air or other fluid. In the example shown, the cylinder member 31 forms part of a dashpot system and slides over a piston 38 which is secured to the housing 32. A compartment 39 (FIG. 7) within the cylinder 31 varies in volume according to the relative positions of the cylinder 31 and piston 38, and is of minimum volume when the outlet valve 10 is open—i.e., the cylinder 31 is at the position shown in FIG. 3. A one-way valve means may permit relatively free entry of air to the compartment 34 during movement of the cylinder 31 towards the activated position of FIG. 3, but entry of air to the compartment 34 during movement of the cylinder 31 in the opposite direction, is preferably limited to a restricted passage—e.g., such as through an adjustable needle valve. That restricted bleed arrangement naturally retards return movement of the cylinder 31 under the influence of its biasing spring 35.

In the particular arrangement shown, the aforementioned one-way valve comprises a circumferential seal member 40 which is secured to the piston 38 and has an outer flexible skirt 41 which slidably engages the inside surface 42 of the cylinder 31. The arrangement is such that air can be exhausted between the skirt 41 and the cylinder surface 42 during movement of the cylinder 31 from the FIG. 1 position towards the FIG. 3 position, since the pressure of air within the compartment 39 will force the skirt 41 inwards away from the cylinder surface 42. During return movement of the cylinder 31 however, expansion of the compartment 39 will cause a reduction of the air pressure within that compartment so that the higher atmospheric pressure existing in the housing chamber 43 acts against the skirt 41 to force it into firmer contact with the cylinder surface 42. Thus, entry of air to the compartment 39 past the seal member 40 is prevented.

The compartment 39 communicates with a chamber 44 provided within the piston 38 so that the compartment 39 and chamber 44 constitute a common space. A bleed valve 45 (FIG. 7) controls entry of air to that space during movement of the cylinder 31 from the position shown in FIG. 3 and because that entry is restricted the movement of the cylinder 31 is retarded. In the particular arrangement shown, the valve 45 has a threaded stem 46 which engages with a surface of a bore 47 formed through the end of the piston 38. The thread of the stem 46 penetrates into the bore surface to a limited extent so that air is able to pass through the helical space provided between that bore surface and the root diameter of the thread. Axial adjustment of the valve 45 to increase or decrease the length of penetration of the stem 46 within the bore 47, will serve to increase and decrease respectively the restrictive effect on entry of air into the piston chamber 44. Consequently, the valve 45 can be regulated to provide any desired degree of retardation on movement of the cylinder 31 from the FIG. 3 position.

A feature of the particular construction shown is that the time delay affect is interrupted during travel of the cylinder 31 from the FIG. 3 position to the FIG. 1 position. That is, the speed of movement of the cylinder 31 is increased during part of its travel, which part preferably includes the position at which the valves 9 and 10 are changed to the fill condition. The speed increase may commence before the FIG. 4 position is reached and may terminate slightly beyond that position—i.e., towards the FIG. 5 position. One method of achieving the speed change is through one or more axially extending by-pass grooves 48 (FIG. 7) formed in the wall of the cylinder 31 and arranged to allow air to pass around the seal skirt 41 while the grooves 48 travel across the skirt 41. When the upper edge 49 of each groove 48 has passed below the terminal edge 50 of the skirt 41, the by-pass facility will be removed so that the cylinder speed will drop back to that determined by the valve 45. The increased speed assists in achieving positive change of the valve condition and also avoids an unnecessary delay in the travel of the cylinder 31 back to the FIG. 1 position. That is, travel of the cylinder 31 need only be delayed during the actual discharge and fill periods.

It is further preferred to provide one or more exhaust ports 51 (FIG. 7) through the wall of the cylinder 31 so as to negate the valve affect of the seal 40 when the cylinder 31 approaches and is at the FIG. 1 position. That allows the air pressure within and without the compartment 39 to be equalized so that spring 35 can apply its full bias potential on the cylinder 31 for a reason hereinafter made clear.

Quite clearly, other time delay means may be employed. Also, the particular means described may be varied in many ways. For example, the cylinder may be fixed and the piston may form the movable active component of the actuator means.

It is preferred to hold the actuator button 36 against movement from its rest position (FIG. 1) during at least the major part of the return movement of the cylinder 31. That may be achieved through an interlock which is responsive to movement of the cylinder 31 to release the button 36 when the cylinder 31 reaches a predetermined position in its return travel. It is further preferred that the interlock functions to hold the cylinder 31 against descent from the FIG. 3 position until the button 36 has arrived back at its operative position (FIGS. 1 and 4).

In the preferred arrangement shown, the interlock includes two pair of first and second latches 52 and 53 (FIGS. 7–12). The first latch 52 is operative to hold the cylinder 31 against descent from the FIG. 3 position when at the latching position shown in FIG. 10 and the second latch 53 is operative in the latching position shown in FIGS. 11 and 12 to hold the button 36 against movement from its operative position. It is also preferred as shown that the latches 52 and 53 have cooperative engagement so that movement and positioning of the second latch 53 can influence the position of the first latch 52. In the particular arrangement shown, the first latch 52 sits within a V-shaped camming recess 54 of the second latch 53 and is urged by gravity to rest in that recess. The second latch 53 on the other hand is influenced by spring 55 to adopt the latching position shown in FIGS. 11 and 12 and swings about the pivot 56 in moving between that position and the de-latching position shown in FIG. 10.

Figure 11:
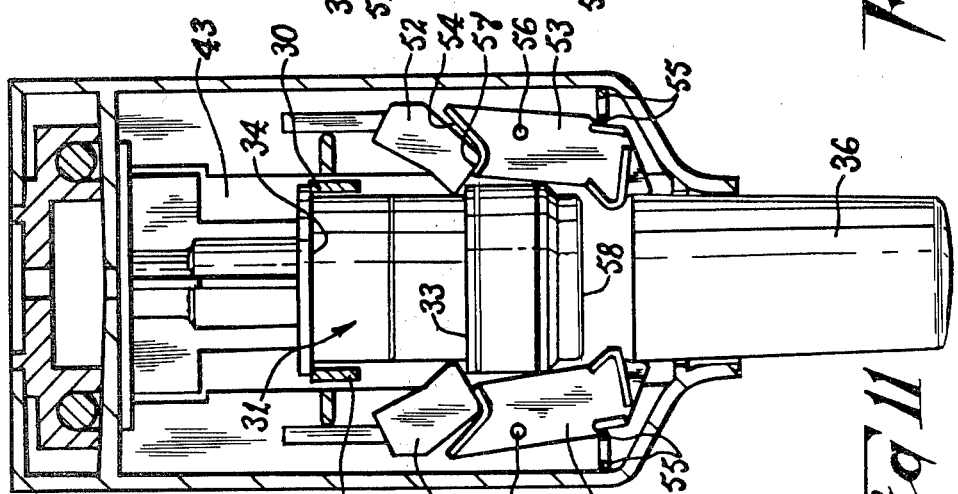
FIG. 11 is a cross-sectional view taken along line XI—XI of FIG. 4.
Figure 12:
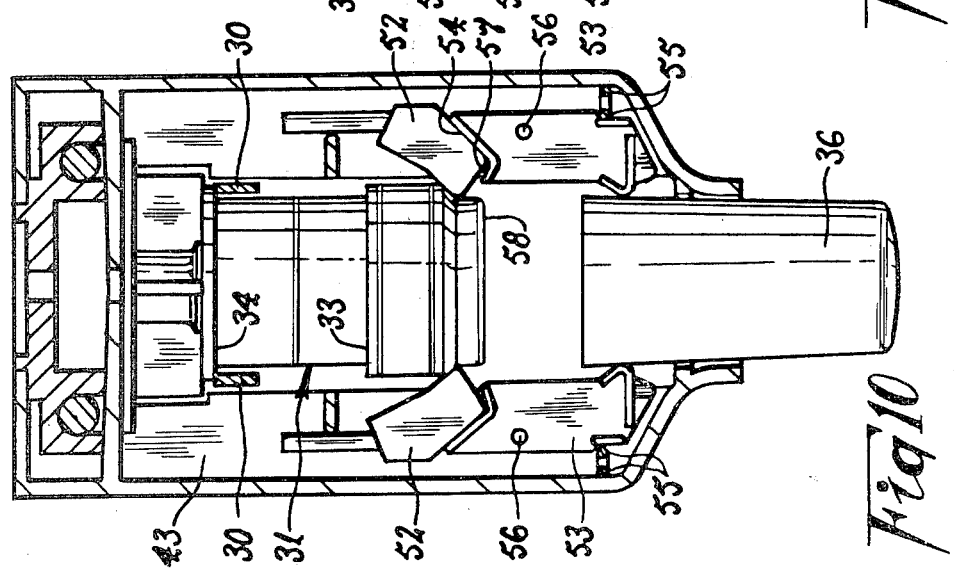
FIG. 12 is a cross-sectional view taken along line XII—XII of FIG. 5.

It will be seen from FIGS. 8 and 9 that the first latch 52 is able to adopt its latching position when the second latch 53 is at its de-latching position, which in those views is retained by engagement of the latch 53 with the surface of button 36. At the FIG. 8 position however, the first latch 52 is prevented from dropping into its latching position because of engagement with a surface of the cylinder 31. When the cylinder 31 is raised to the activated position of FIG. 3 however, the latch 52 drops under gravity to the base of recess 54 and thereby adopts the latching position shown in FIG. 9 such as to prevent descent of the cylinder 31. That condition is maintained until the button 36 is allowed to drop back to its operative position as shown in FIGS. 11 and 12 at which time the second latch 53 is freed to swing inwards under the influence of the spring 55 and as a result of that movement surface 57 of the recess 54 pushes the latch 52 upwards to a de-latching position such that the cylinder 31 is freed for descent.

It will be appreciated that at the time of releasing the latch 52 the latch 53 moves into its latching position to prevent upward travel of the button 36. The button 36 is thereby held until the cylinder 31 descends to its original rest position at which it forces the latch 53 outwards to its de-latching position as shown in FIG. 7. The previously mentioned exhaust ports 51 allow the cylinder spring 35 to have its full affect at this time to ensure that the latch 53 is positively forced into the de-latching position.

It will be appreciated that other forms of interlock may be used, but the form described has the advantage of simplicity and effectiveness.

The actuator button 36 and discharge nozzle 7 are preferably arranged in side by side, but spaced relationship as shown. The spacing between those two members is preferably predetermined so that a person may hold a glass for example under the nozzle 7 with one hand, and at the same time press the actuator button 36 with the same hand. With that arrangement, the glass need not touch any exposed part of the dispenser, and the actuator button 36 can be released by the operator immediately discharge of liquid commences.

In an alternative form (not shown) of the dashpot construction described, the air compartment 39 may be of maximum volume at the position of the cylinder 31 in which the valves 9 and 10 are in the discharge condition. With that arrangement, air is drawn into the compartment 39 through a one-way valve or the like, during movement of the cylinder 31 towards the FIG. 3 position. During movement in the opposite direction however, air can escape from the compartment 39 only through a restricted passageway, which may include an adjustable needle valve, and consequently movement of the cylinder 31 is retarded.

When the construction particularly described is mounted on a bottle ready for operation, the actuator button 36 and cylinder 31 will be in their lowermost positions as shown in FIG. 1. Consequently, the valves 9 and 10 will be in the fill condition, and the metering chamber 2 will be full of liquid received from the bottle through the open inlet port 9. An operator who holds a glass under the discharge nozzle 7 with one hand, can engage the actuator button 36 with a finger of the same hand and push that button 36 upwards. During the first part of that upward movement, the cylinder 31 which follows movement of the button 36, has no influence on the valve condition because the lowermost abutment 33 of the cylinder 31 was initially spaced some distance below the arm 30 of member 20. That abutment 33 engages the arm 30 however, near the end of the available travel of the button 36, and continued upward travel causes the arm 30 to swing beyond the FIG. 2 position and the spring 27 then takes over to cause the valves 9 and 10 to snape into the discharge condition in the manner previously described. It is significant however, that the valves 9 and 10 are both closed immediately before the change to the discharge condition occurs and that is brought about by the abutment 24 releasing its influence on the valve 9.

The outlet valve 10 is therefore opened and the inlet valve 9 was previously closed as mentioned, so that the metering chamber 2 starts to empty into the glass, but entry of further liquid into the chamber 2 from the bottle is prevented. The operator can release the actuator button 36 and it will return to the lower operative position as described, and thereby free the cylinder 31 for its return movement under the influence of the biasing spring 35. Such return movement of the cylinder 31 however, is retarded by the restricted flow of air into the cylinder compartment 39, so that the cylinder 31 returns at a rate much slower than the actuator button 36. That rate of return is predetermined so that the cylinder 31 will not arrive at the FIG. 4 position until the metering chamber 2 has emptied. As previously mentioned however, the speed of the cylinder return may be temporarily increased around the time of the change of valve condition, which occurs immediately after the FIG. 4 position.

It will be understood from the foregoing description that the interlock prevents the operator from pushing the actuator button 36 upwards during the time the cylinder 31 is returning towards its lowermost rest position. It may be however, that the operator will have held the button 36 against returning fully to its lower position from the moment the valves 9 and 10 changed to the discharge condition. Under those circumstances, if the operator continues to hold the button 36 in such a position, the cylinder 31 will be prevented from moving down by the action of latch 52. If the operator then pushes the button 36 upwards from the held position, there will also be no affect on the valve condition since the arm 30 of the member 20 will still be in the position corresponding to the discharge condition of the valves 9 and 10.

Assuming the button 36 has been allowed to return to its operative position as in FIGS. 11 and 12, and is thereby held by the latch 53, the cylinder 31 will eventually reach the position at which the upper abutment 34 engages the arm 30 and continued downward movement causes that arm to swing beyond the FIG. 4 position so that the valves 9 and 10 are snapped across to the fill condition. At the FIG. 4 position however, both valves 9 and 10 are closed. As a consequence of the valve change-over the metering chamber 2 commences to fill under the flow of liquid received from the bottle. When the cylinder 31 approaches its lowermost rest position, the cam surface 58 on the cylinder 31 moves the interlock latch 53 to an inoperative position so that the actuator button 36 is freed for subsequent operation.

Freeing of the interlock latch 53 will not occur until there has been a sufficient elapse of time for the metering chamber 2 to fill after the valves 9 and 10 have changed to the fill condition. That time delay may be achieved in the manner described or it may be achieved by preventing movement of some other component such as the yoke member 20 rather than preventing movement of the actuator button 36. In the arrangement particularly described, the time delay arising out of retarded downward movement of the cylinder 31, involves two stages. In the first stage, the metering chamber 2 empties, and that stage ends when the valves 9 and 10 are changed to the fill condition. The second stage follows immediately and ends when the interlock latch 53 is released, and during that stage the metering chamber 2 fills.

In the preferred construction shown, a bleed valve 59 is provided to allow entry of air to the metering chamber 2 during the discharge condition. The valve 59 is preferably spring influenced into its closed position as shown in FIGS. 1 and 2 and may be engaged by the member 20 (FIG. 3) during the final part of the movement of that member to the extreme position corresponding to the discharge condition of the valves 9 and 10. As a result of that engagement the valve 59 is opened to allow air to enter the chamber 2 during the discharge operation. The valve 59 closes automatically as the member 20 is returned towards its initial position (see FIG. 4).

It will be apparent from the foregoing description that the invention provides an accurate and hygenic dispenser, which is constructed so as to minimize or prevent improper manipulation by an operator. Furthermore, the invention has obvious applicability to a wide range of materials and it may be that in some applications, initiation of the discharge operation may be effected automatically rather than manually as described.

There are many possible variations of the particular construction described. For example, the valve members may be located at opposite ends of a plunger which is mounted within or adjacent the metering chamber for endwise movement. The actuator means is also open to substantial variation. For example, the active component may be a rod or bar connected to part of the time delay means, and the abutments may be ends of a slot, groove, or recess, which receives a pin or other striker connected to the valve means. In yet another arrangement, an active component may be attached to or may form part of, bellows which function as part of the time delay means. That is, bellows may be employed instead of the dashpot as previously described.

Furthermore, in any construction involving a snap action change in the valve condition, any spring used for that purpose need not be a coil spring as described. One possible alternative is a leaf spring formed substantially into the shape of a C and having each of its ends connected to a respective one of two members between which it acts. The tendency of the spring to straighten provides the necessary force to cause a change of valve condition.

Still further, the actuator button 36 need not be slidable as described, but it may be pivotally mounted.

According to yet another variation, there may be two metering chambers, each having its own inlet and outlet valves arranged so that one chamber fills as the other empties. The influence of the actuator alternates between the two chambers in that one operation causes one chamber to empty and the succeeding operation causes the other chamber to empty. Such an arrangement of course obviates the need for a second stage time delay as previously described.

The time delay as described involves slow movement of a member between two operative positions. It will be realised however, that the desired result may be achieved by having delayed release of a member which moves quickly, rather than having a member which is always free to move between the two positions, but moves slowly. Such delayed release can be achieved through a latch or detent controlled by a dashpot system as described.

In any one of the embodiments described, part of the metering chamber may be transparent, or a sight glass may be provided whereby a person is able to see whether or not the chamber is full of liquid.

It is to be appreciated that the valve mechanism described and particularly the snap action valve mechanism, need not be used in association with control means and/or actuating means of the kind described. That is, the valve mechanism is considered to be unique in itself and has applications other than in dispensers or of the kind indicated, or if it is used in dispensers it need not be associated with other components which are equivalent in function and/or form to the components of the actuator and control means described. In particular, lost motion means and/or time delay means as described need not be associated with the valve mechanism. It is an object of a further aspect of this invention to provide a valve mechanism which is usable for any purpose and in association with any other apparatus or means.

Finally, it is to be understood that various alterations, modifications and/or additions may be introduced into the constructions and arrangements of parts previously described without departing from the spirit or ambit of the invention as defined by the appended claims.

Having now described our invention, what we claim as new and desire to secure by Letters Patent is:

1. A dispenser device including, a metering chamber having a wall part, an inlet port and an outlet port, an inlet valve operative to open and close said inlet port in fill and discharge conditions respectively of said metering chamber, an outlet valve operative to close and open said outlet port in said fill and discharge conditions respectively, and actuator means operative to cause movement of said valves to effect a change of the said conditions of said metering chamber, the arrangement being such that said inlet valve closes said inlet port before said outlet valve opens said outlet port during a change from said fill condition to said discharge condition, each of said valves being independently mounted for movement relative to said metering chamber and including a stem slidably mounted in said wall part of said metering chamber, a head portion located within said chamber, and a resilient sleeve which has an end wall at one end and is open at its other end, said end wall being located over and attached to said head portion and said open end being attached to said wall part, said sleeve being subjected to axial compression in the port open position of its respective valve to thereby apply a biasing force which urges said head portion into a port closing position in which said end wall of said sleeve engages a surface surrounding a corresponding one of said ports.

2. A dispenser device according to claim 1, wherein an air bleed valve is provided in a wall of said metering chamber and is automatically operated to open during a change from said fill condition to said discharge condition.

3. A dispenser device according to claim 1, wherein said valves are arranged angularly relative to one another.

4. A dispenser device according to claim 1, wherein said actuator means includes a piston secured to a housing of said device against relative movement, a cylinder mounted on said piston for movement relative thereto between rest and activated positions respectively, spring means biasing said cylinder towards the rest position and delay means operative to retard movement of said cylinder from the activated position to the rest position.

5. A dispenser device according to claim 4, wherein said delay means includes a restricted aperture and a space within said cylinder which communicates with atmosphere through said restricted aperture.

6. A dispenser device according to claim 5, wherein said space is within both said piston and said cylinder and said restricted aperture is at one end of said piston, and a one-way valve is provided to allow entry of air into said space during movement of said cylinder towards said activated position but not during movement of said cylinder towards said rest position.

7. A dispenser device according to claim 6, wherein said one-way valve includes a circumferential seal member provided between opposed surfaces of said piston and cylinder and slidably engaging one of those surfaces.

8. A dispenser device according to claim 5, wherein said time delay means is by-passed during part of the movement of said cylinder from the activated position to the rest position so that the speed of cylinder movement is increased over that part, and said valves are caused to adopt positions corresponding to said fill condition during said movement part.

9. A dispenser device according to claim 8, wherein by-pass means is operative to allow temporary relatively unimpeded access of air to said space during said movement part, and said movement part is concluded before said cylinder reaches said rest position.

10. A dispenser device according to claim 9, wherein atmosphere communicates with said space through an air port which is connected to said space during movement of said cylinder toward said rest position and remain so connected at said rest position.

11. A dispenser device according to claim 10, wherein said air port is not connected until said cylinder has moved a distance beyond the position at which said by-pass means is rendered inoperative.

12. A dispenser device according to claim 1, wherein said actuator means is operated through an actuator member which is movable between an operative position and an inoperative position, and interlock means prevents operation of said actuator means to cause said fill condition to be adopted if said actuator member is not at its operative position.

13. A dispenser device according to claim 12, wherein said interlock means is operative to prevent said actuator member being moved from said operative position during a change from said discharge condition to said fill condition.

14. A dispenser device according to claim 12, wherein said actuator means includes a piston secured to a housing of said device against relative movement, a cylinder mounted on said piston for movement relative thereto between rest and activated positions respectively, spring means biasing said cylinder towards the rest position and delay means operative to retard movement of said cylinder from the activated position to the rest position, said interlock means includes a first latch which engages said cylinder to prevent movement substantially beyond said activated position towards said rest position, and said actuator member is operative to release said first latch upon location at said operative position.

15. A dispenser device according to claim 14, wherein said interlock means includes a second latch which is operative to prevent movement of said actuator member out of said operative position while said cylinder is travelling towards said rest position, and said cylinder is operative to release said second latch upon location at said rest position.

16. A dispenser device according to claim 15, wherein said second latch cooperatively engages with said first latch to cause the first latch to release said cylinder in response to movement of said second latch into its latching position, and said first latch is freed for movement into its latching position by movement of said second latch into its de-latching position.

17. A dispenser device according to claim 15, wherein said second latch is spring influenced into its latching position and said first latch is influenced into its latching position by gravity.

18. A dispenser device including, a metering chamber having an inlet port and an outlet port, an inlet valve operative to open and close said inlet port in fill and discharge conditions respectively of said metering chamber, an outlet valve operative to close and open said outlet port in said fill and discharge conditions respectively, and actuator means operative to cause movement of said valves to effect a change of the said conditions of said metering chamber, the arrangement being such that said inlet valve closes said inlet port before said outlet valve opens said outlet port during a change from said fill condition to said discharge condition, said actuator means being operative to influence said valves through a valve control member which is movable by the actuator means between two extreme positions, the arrangement being such that said fill condition exists at one of said extreme positions and said discharge condition exists at the other, said actuator means being movable between rest and activated conditions which respectively correspond to said fill and discharge conditions, said valve control member being mounted for rocking movement about a pivot axis and being spring influenced into either one of said extreme positions according to whether said valve control member is to one side or the other of a particular pivotal position, said valve control member being inoperative to cause opening movement of said outlet valve until said particular pivotal position has been passed in travelling towards said other extreme position and being operative to cause said inlet valve to close before reaching said particular pivotal position in travelling towards said other extreme position, said valve control member being inoperative to cause opening movement of said inlet valve until said particular pivotal position has been passed in travelling towards said one extreme position and being operative to cause said outlet valve to close before said particular pivotal position is reached in travelling towards said one extreme position, and said valve control member being arranged to travel a substantial distance beyond said particular pivotal position to reach either of said extreme positions.

19. A dispenser device according to claim 18, wherein abutments on said valve control member are engageable with parts of said valves to cause movement of said valves at least in the port opening direction.

20. A dispenser device according to claim 18, wherein said actuator means causes ssid valve control member to move into said particular pivotal position when at least close to said activated condition during movement from the rest condition and causes said valve control member to move into said particular pivotal position only after substantial movement from said activated condition during movement towards said rest condition.

21. A dispenser device according to claim 18, wherein said valve control member applies a positive closing force to said outlet valve when in said one extreme position.

22. A dispenser device according to claim 18, wherein said actuator means includes a piston secured to a housing of said device against relative movement, a cylinder mounted on said piston for movement relative thereto between rest and activated positions respectively, spring means biasing said cylinder towards the rest position and delay means operative to retard movement of said cylinder from the activated position to the rest position, said cylinder has two spaced and opposed abutment surfaces and said valve control member has at least one arm which is located between said abutment surfaces so that said valve control member is moved between its extreme positions by engagement of said arm with one or the other of said abutment surfaces during movement of said cylinder between its rest and activated positions.

23. A dispenser device according to claim 18, wherein lost motion means is included in the connection between said actuator means and said valves so that said valves are not moved into positions corresponding to said discharge condition until said actuator means is at least close to said activated condition.

24. A dispenser device according to claim 23, wherein said lost motion means is provided at least in part in the connection between said valve control member and said valves.

25. A dispenser device including, a metering chamber having an inlet port and an outlet port, an inlet valve operative to open and close said inlet port in fill and discharge conditions respectively of said metering chamber, an outlet valve operative to close and open said outlet port in said fill and discharge conditions respectively, actuator mechanism operable from a rest condition to cause said valves to move from the positions corresponding to said fill condition to the positions corresponding to said discharge condition, biasing means operative to return said mechanism to said rest condition, said actuator mechanism being operable during said return to cause said valves to move from the positions corresponding to said discharge condition to the positions corresponding to said fill condition, and time delay means operative to retard said actuator mechanism return and being arranged so that the speed of said return is different during at least one part of said return then what it is during at least one other part.

26. A dispenser device including, a metering chamber having an inlet port and an outlet port, an inlet valve operative to open and close said inlet port in fill and discharge conditions respectively of said metering chamber, an outlet valve operative to close and open said outlet port in said fill and discharge conditions respectively, a valve control member movable between two extreme positions and being operative to influence said valves so that said fill condition exists at one said extreme position and said discharge condition exists at the other said extreme position, a cylinder movable over a fixed piston between a rest position and an activated position, said cylinder being operative during movement from said rest position to said activated position to cause said valve control member to adopt the said other extreme position and being operative during movement from said activated position to the rest position to cause said valve control member to adopt said one extreme position, an actuator member operable to move said cylinder from said rest position to said activated position, biasing means operative to move said cylinder from said activated position to said rest position, and delay means operative to resist movement of said cylinder under the influence of said biasing means to limit the speed at which said cylinder is returned to said rest position.

27. A dispenser device including, a metering chamber having an inlet port and an outlet port, an inlet valve operative to open and close said inlet port in fill and discharge conditions respectively of said metering chamber, an outlet valve operative to close and open said outlet port in said fill and discharge conditions respectively, actuator means operative to cause movement of said valves to effect a change of the said conditions of said metering chamber, said actuator means including an active component movable between rest and activated positions which correspond respectively to said fill and discharge conditions, an actuator member manually operable to move said active component to said activated position, biasing means operative to urge said active component towards said rest position, and delay means operative to retard movement of said active component towards said rest position, a first latch operative to retain said active component in said activated position until said actuator member returns to an operative position and being urged by gravity into its latching position, and a second latch operative to retain said actuator member in its operative position until said active member reaches its rest position and being spring influenced into its latching position, said first and second latches cooperatively engaging so that the first latch is moved into a de-latching position in response to movement of the second latch into its latching position and so that said first latch is freed for movement towards its latching position when said second latch is moved into its de-latching position.

28. A dispenser device including, a metering chamber having an inlet port and an outlet port, an inlet valve operative to open and close said inlet port in fill and discharge conditions respectively of said metering chamber, an outlet valve operative to close and open said outlet port in said fill and discharge conditions respectively, a valve control member acting directly on said valves to cause movement thereof and being movable between two extreme positions to cause said valve movement, an active component operable directly on said valve control member to cause movement thereof between said extreme positions and being movable between a rest position and an activated position which correspond respectively to said fill and discharge conditions, delay means operable to retard movement of said active component from the activated position to the rest position, and interlock means operative to prevent movement of said active component from said activated position until the device is reset for a subsequent operation cycle and to prevent return of said active component to said activated position after commencement of movement from that position and until said rest position has been reached.

* * * * *